United States Patent [19]

Bottoms

[11] 3,719,217
[45] March 6, 1973

[54] METHOD AND APPARATUS FOR DELIMBING A TREE

[75] Inventor: William A. Bottoms, Kamloops, British Columbia, Canada

[73] Assignee: Eaton Yale & Towne Canada Limited, London, Ontario, Canada

[22] Filed: Dec. 11, 1970

[21] Appl. No.: 97,097

[52] U.S. Cl. ..............................................144/2 Z
[51] Int. Cl. ...........................................A01g 23/08
[58] Field of Search........144/2 Z, 3 D, 34 E, 309 AC

[56] References Cited

UNITED STATES PATENTS

| | | | |
|---|---|---|---|
| 3,140,736 | 7/1964 | Propst | 144/2 Z |
| 3,461,926 | 8/1969 | Larson | 144/2 Z |
| 3,498,350 | 3/1970 | Maradyn | 144/309 AC |
| 3,556,183 | 1/1971 | Busch | 144/34 R |
| 3,612,117 | 10/1971 | Kjell | 144/2 Z |

Primary Examiner—Gerald A. Dost
Attorney—Yount and Tarolli

[57] ABSTRACT

A tree having limbs thereon is positioned between a pair of delimbing jaws pivotally mounted on a frame. The jaws have means for removing the limbs from the tree upon movement of the jaws relative to the tree. Vibrating means is also provided for vibrating the jaws which results in a cutting action as the jaws engage the limbs on the tree to sever the limbs therefrom. Drive means is provided to rotate the jaws into engagement with the tree trunk and maintain the jaws in engagement with the trunk with a force dependent on the diameter of the tree trunk.

20 Claims, 7 Drawing Figures

PATENTED MAR 6 1973 3,719,217

INVENTOR

WILLIAM A. BOTTOMS

BY Yount and Tarolli
ATTORNEYS

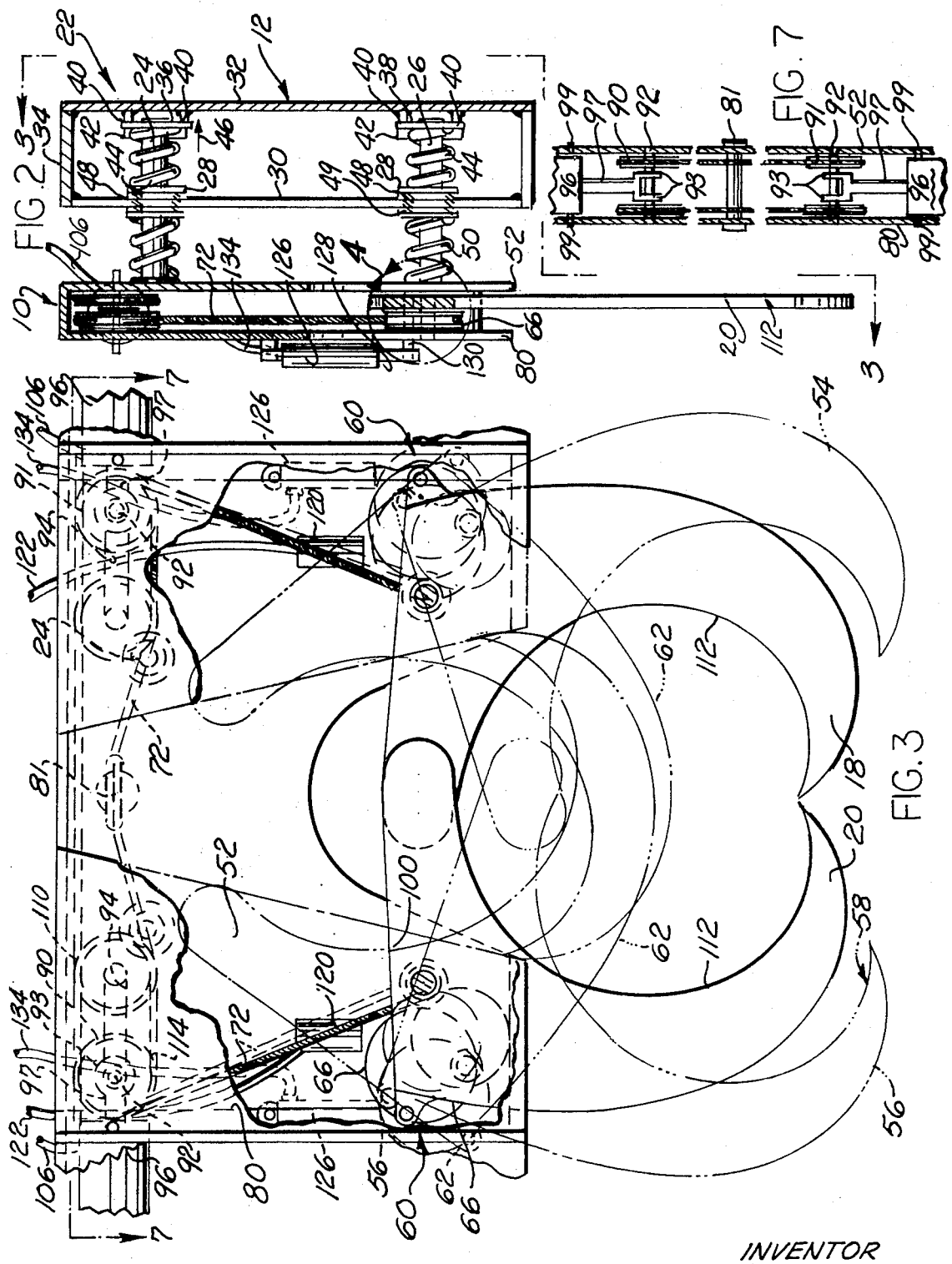

INVENTOR
WILLIAM A. BOTTOMS

BY Yount and Tarolli
ATTORNEYS

METHOD AND APPARATUS FOR DELIMBING A TREE

The present invention relates to a method and an apparatus for removing limbs from a tree, and particularly relates to a method and an apparatus for removing the limbs from a tree and wherein a pair of delimbing jaws engage the tree and move relative to the tree to effect delimbing thereof.

In known methods and apparatuses for removing limbs from a tree a pair of delimbing jaws are urged into engagement with the tree trunk and then move along the tree to remove the limbs therefrom. It has been discovered that by vibrating the jaws as they move along the tree, substantial advantages may be realized. These advantages include the removal of the tree limbs by the impact, multiplied force and cutting action created by the vibration of the jaws.

In addition, the delimbing jaws of the prior art are urged together by means which does not vary the pressure on the jaws dependent on the tree trunk diameter. It should be understood that the limbs at a smaller trunk diameter portion of the tree are of a small size than at the larger trunk diameter portion and, therefore, less force is required to remove these smaller limbs from the trunk of the tree. When operating the prior art devices, the operator would continually juggle with the controls of the jaw force to compensate for the change in force necessary due to changes in limb size.

The present invention relates to a method and an apparatus for removing the limbs from a tree wherein a pair of delimbing jaws are pivotally mounted to a frame. The delimbing jaws define an opening therebetween to receive a tree to be delimbed. Means is provided for vibrating the jaws so that the jaws remove the limbs by impact, multiplied force and cutting action. In addition, a jaw-actuating means is provided to urge the jaws together with a force dependent on the tree trunk diameter. The jaw-actuating means provides for a greater jaw force at the larger diameters where the largest limbs are located and a lesser force in the smaller diameter areas.

Accordingly, the principal object of the present invention is the provision of a new and improved method and apparatus for removing the limbs from a tree wherein a vibrating means vibrates a pair of delimbing jaws as the jaws move along a tree so as to impart vibratory motion to the jaws to remove the limbs from the tree by impact, multiplied force, and cutting action.

Another object of the present invention is the provision of a new and improved method and apparatus for removing the limbs from a tree, as noted in the next preceding paragraph, and wherein the jaws are mounted in a manner so that the vibration is substantially isolated in the jaws.

Still another object of the present invention is the provision of a new and improved method and apparatus for removing the limbs from a tree wherein a pair of jaws receives a tree therebetween and are urged against the tree trunk with a force dependent on the diameter of the tree trunk, so that a greater force is imparted to the jaws to remove the largest limbs which are located at the larger diameters of the trunk and a reduced force is imparted to the jaws at the smaller diameters of the trunk of the tree.

Further objects, advantages and features of the present invention will be apparent to those skilled in the art to which it relates from the following detailed description of a preferred embodiment made with reference to the accompanying drawings forming a part of this specification and in which:

FIG. 2 is a sectional view of the delimbing mechanism shown in FIG. 1, taken along line 2—2 thereof;

FIG. 3 is a fragmentary side elevational view of the delimbing mechanism shown in FIG. 2, taken along line 3—3 thereof and with parts broken away;

FIG. 7 is a schematic top view of a portion of the delimbing mechanism shown in FIG. 1 and taken along line 7—7 thereof.

Figure 1:
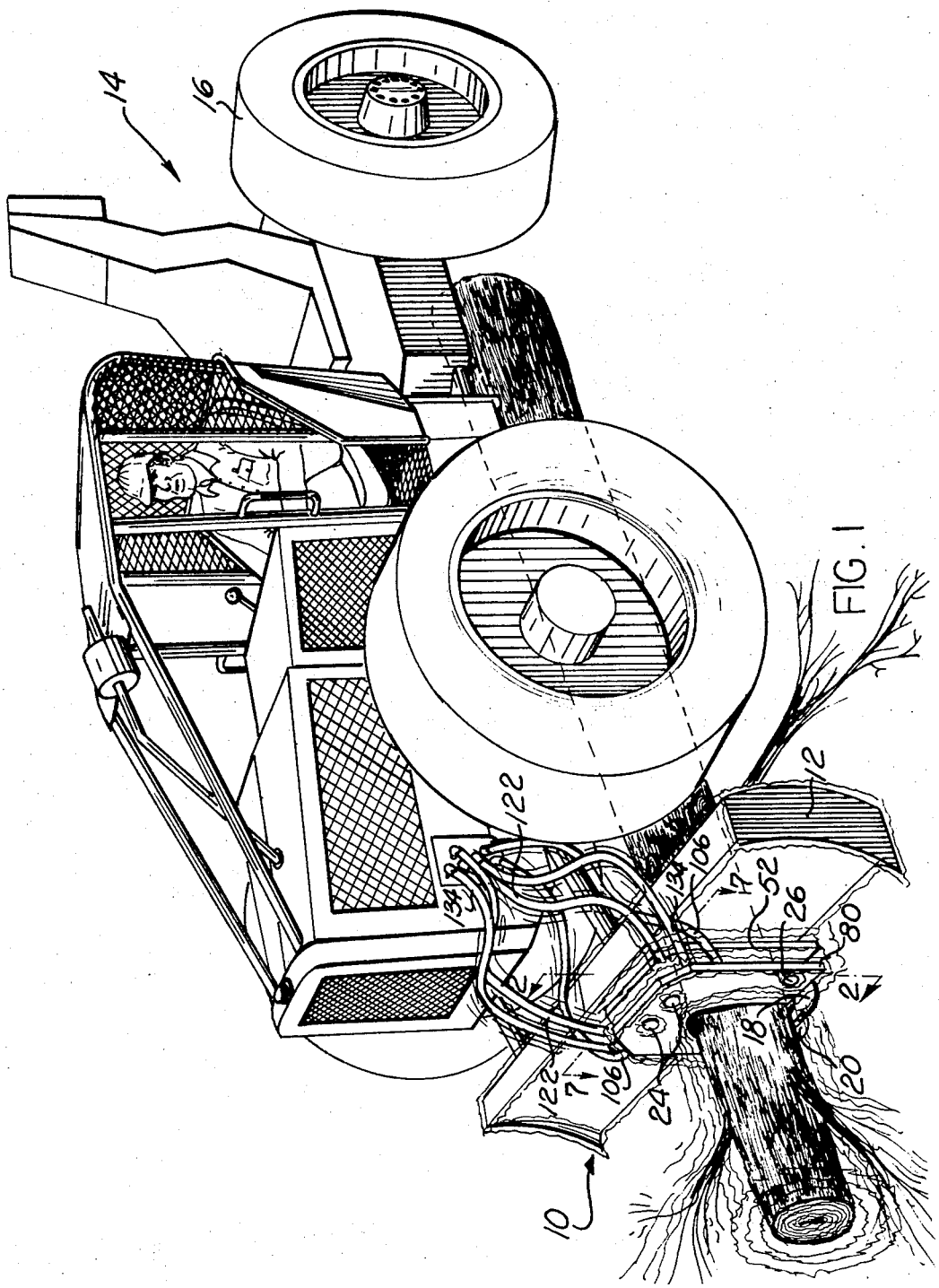
FIG. 1 is a perspective view of a delimbing mechanism mounted on a vehicle.

The present invention provides a new and improved method and apparatus for removing the limbs from a tree wherein a pair of delimbing jaws receive a tree to be delimbed and the jaws are vibrated as they move along the tree so that the limbs are removed therefrom. As a result of the vibration, the limbs are removed by impact, multiplied force and cutting action. In addition, the present invention provides a mechanism which automatically varies the force that the jaws exert on the tree so that a greater leverage is applied at the larger diameters of the tree trunk where the largest limbs are located, and a reduced leverage is applied at the smaller diameters of the trunk where the smaller limbs are located. This automatic force control permits quick and efficient cycles. The present invention may be applied to methods and apparatuses of a wide variety of constructions and designs for removing the limbs from a tree and for purposes of illustration is shown in the drawings as applied to a delimbing apparatus 10, shown in FIG. 1.

The delimbing apparatus 10 for removing the limbs from a tree is mounted on the blade 12 of a wheel vehicle, such as a grapple skidder 14. The grapple skidder 14 comprises a vehicle which includes an engine associated with a drive means for driving the ground-engaging wheels 16 thereof so that the vehicle may be propelled along the ground. The delimbing apparatus 10 is mounted on the blade 12 of the grapple skidder 14 and may be moved and transported by the grapple skidder to various locations. The apparatus 10 is hereinafter described for use in removing the limbs from a felled tree. It should be understood that when the apparatus is suitably mounted, it may also be used to delimb standing trees.

When trees are felled, they naturally position themselves on the ground in a haphazard manner. Since these trees are usually harvested in a forest, other trees remain standing and obstruct delimbing operations on the felled trees. The grapple skidder 14 is designed to maneuver around these standing trees and position the delimbing apparatus 10 in a position to delimb a tree and subsequently move the delimbing apparatus 10 therealong so that the limbs of the tree are removed therefrom as hereinafter described.

In order to remove the limbs from a felled tree, the grapple skidder 14 positions the delimbing apparatus 10 adjacent to one end of a tree to be delimbed, so that jaws 18, 20 of the delimbing apparatus 10 define an opening which receives the tree therein. A force is exerted on the jaws 18, 20 to urge them together and a vibratory motion is also induced in the jaws; when the jaws are so operated, the limbs are removed from a tree by impact, multiplied force, and cutting action of the jaws as the jaws move along the tree. The grapple skidder 14 moves the delimbing apparatus 10 and, consequently, the jaws 18, 20 along the length of the felled tree, and the jaws 18, 20 remove the limbs therefrom as they move along the tree.

Figure 5:
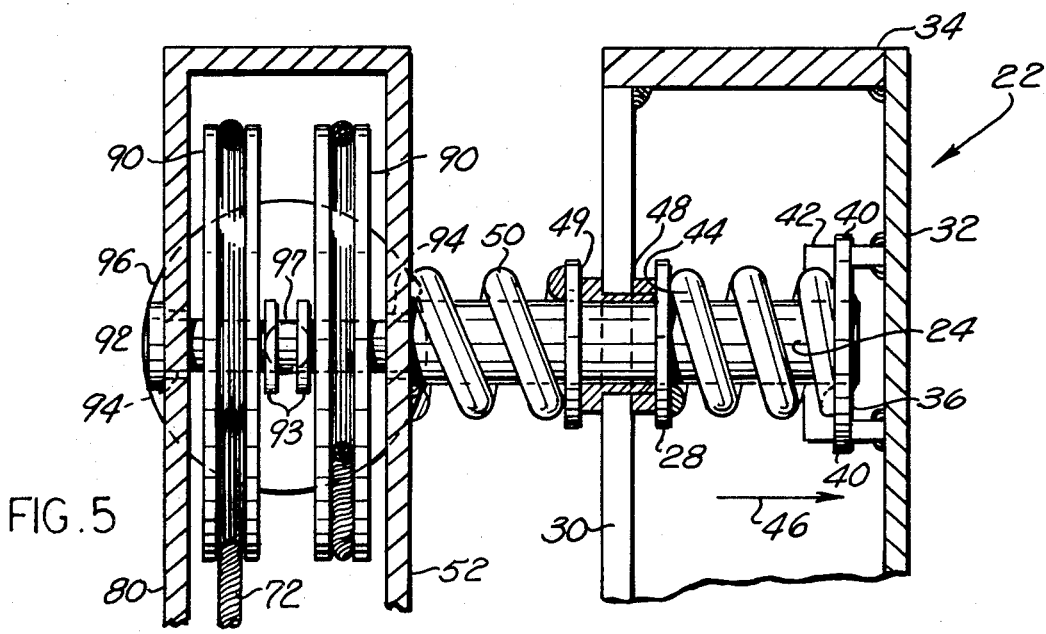
FIG. 5 is an enlarged sectional view of a portion of the delimbing mechanism shown in FIG. 2.

The apparatus 10 is mounted on the blade 12 of the grapple skidder 14 by a mounting means, generally indicated at 22, in a manner which isolates the vibration in the jaws 18, 20. The mounting means 22 includes rod members 24, 26 for supporting the delimbing apparatus 10. The rods 24, 26 are slidably received in bearing members 28 located in openings 48 in a mounting plate 30 which is secured to the member 32 of the blade 12 by the upper and lower members 34, as shown in FIGS. 2 and 5.

The rods 24, 26 have one end secured to washers 36, 38, respectively, by any conventional means, such as welding. The washers 36, 38 have a plurality of slots or grooves 40 therein. The slots or grooves 40 of the washers 36, 38 slidably receive the upright portions of members 42. The upright portions of the members 42 allow the washer members 36, 38 to move with respect to the blade 12 along with the rod members 24, 26.

To maintain the rods 24, 26 in a centered position, spring members 44 are provided and have one end in communication with the washers 36, 38 and are co-extensive with the portion of their respective rods between the blade members 30, 32. The other end of the spring members 44 contact the bearing members 28 received by openings 48 in the member 30. The bearing members 28 allow the rods 24, 26 to move in the direction of their longitudinal axis while the springs 44 are in compression and urge the rods in a direction indicated at 46. The bearing members 28 also include a portion 49 of rubber which receives the rods 24, 26.

The mounting means 22 also includes spring members 50 which urge the rods 24, 26 in a direction opposite to the direction indicated by the arrow 46. The springs 50 have one end in communication with the bearing member 28 and the other in communication with a frame member 52. The rods 24, 26 are secured to the frame member 52 by any conventional means. When the springs 50 are compressed, the rods are urged in a direction opposite to the direction in which the springs are compressed and, consequently, the delimbing device 10 tends to return to its original or centered position.

Thus, it may be seen that the mounting means 22 provides a mounting system which confines the vibration to the delimbing mechanism 10 and does not allow such vibration to be dissipated in the blade 12 or any associated mounting mechanism. In operation, when the delimbing mechanism 10 is vibrated, the rod members 24, 26 move and vibrate with the mechanism 10, since they are secured thereto. The springs 50 bias the delimbing mechanism 10 in one direction, while the springs 44 bias the delimbing mechanism 10 in the other direction. Thus, when vibration is induced in the delimbing mechanism 10, the delimber moves with respect to the blade 12, while maintaining itself in a substantially neutral position whereby the vibration induced in the delimbing mechanism 10 is effectively confined thereto and is not dissipated to the vehicle 14. This confinement results due to the fact that the rods 24, 26 and washers 36, 38 can move relative to the blade 12 and the rubber member 49 also cushions and absorbs some vibration.

As noted above, the grapple skidder 14 moves the apparatus 10 to a position adjacent to a tree to be delimbed. The jaws 18, 20 are, of course, in an open position to receive a tree therebetween, generally indicated at 54, 56 in FIG. 3. Thus, the jaws define an opening, generally indicated at 58, to receive a tree to be delimbed.

In order to move the jaws together about the tree trunk, an actuating mechanism 60 is associated with each of the blades 18, 20. For purposes of illustration, only the mechanism 60, associated with the jaw 20, will be described hereinafter. It should be understood that the mechanism 60 used to move the jaw 18 is similar in construction.

The actuating mechanism 60 is used to move the jaws from an open position 54, 56 to a position where the jaws 18, 20 contact the tree and subsequently maintain a force thereon dependent on the diameter of the tree. As the jaws 18, 20 move along the tree, the jaws are forced toward a closed position, generally indicated at 62.

If the delimber mechanism 10 is moved along the tree from the larger end thereof to its smaller end, the jaws 18, 20 will continuously close as they move along the tree and finally reach the position 62. It is desirable that the force exerted on the jaws 18, 20 which moves them together be variable and decrease in magnitude as the tree trunk diameter decreases and the opening 58 decreases, since the limbs on the smaller diameter portions of the tree do not require as much force to remove them from the tree as the limbs on the larger diameter portions of the tree.

Figure 4:
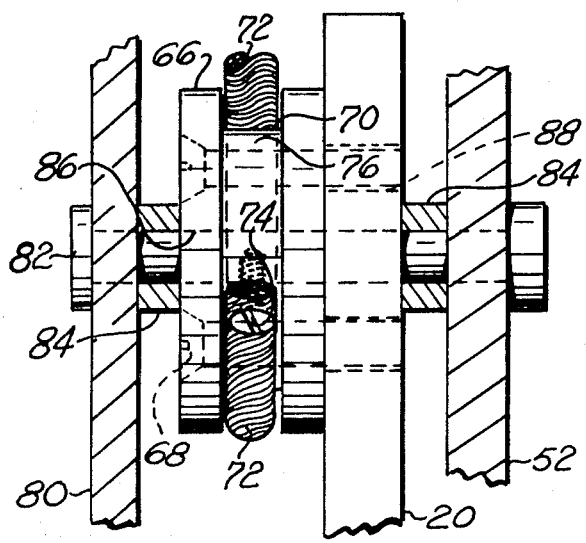
FIG. 4 is an enlarged sectional view of a portion of the delimbing mechanism indicated in FIG. 2 by the circle indicated at 4.

To provide such a variable force, the actuating mechanism 60 includes a cam member 66 secured to the jaw member 20 by any conventional means, such as a threaded fastener 68, as seen in FIGS. 2 and 4. The cam member 66 has a groove 70 therein for receiving a cable 72. The cable 72 has one end secured to the cam 66 by any suitable means, such as the threaded fastener 74. The cable 72 extends about the peripheral cam surface 76 of the cam member 66, so that when a force is supplied to the cable 72, a torque is exerted on the cam member 66 and, consequently, the jaw 20 is forced toward a closed position 62.

The cam member 66 and jaw 20 are pivotally mounted to the frame member 52 and an adjacent frame member 80 by means of a pin 82 extending therebetween. Openings 86, 88 are provided in the cam member 66 and jaw 20, respectively, so that the cam member 66 and jaw 20 are rotatably received by the pin 82. Spacing collars 84 are positioned about the pin 82 to axially position the cam member 66 and jaw 20 with respect to the frame members 52, 80 so that the cam member 66 and jaw 20 are rotatable about the pin 82.

When a force is exerted on the cable 72, the torque exerted on the jaw 20 is dependent on the profile of the cam surface 76 of the cam member 66. The cam 66 is designed so that as the jaw 20 moves toward the closed position 62, the torque exerted thereon consequently decreases in a predetermined manner, and thus the force applied by the jaw 20 on the tree to be delimbed is correspondingly decreased.

In order to exert a force on the cable 72, the other end of the cable 72 is secured to the pin 81 extending between the frame members 52, 80. Pulleys 90, 91 are interposed between the ends of the cable 72 and the cable 72 is trained around the pulleys 90, 91, as seen in FIGS. 3 and 7. The pulleys 90, 91 are rotatable about their respective pins 92. It should be understood that each of the mechanisms 60 have a corresponding pair of pulleys on each of the pins 92, which pulleys are separated by the clevis 93, as shown in FIGS. 5 and 7. The cable 72, extending from the cam 66, is first trained around the pulley 90 and subsequently around the pulley 91 and is then secured to the pin 81, as hereinabove described. The pins 92 are slidably received in slots 94 in each of the frame members 80, 52. Since the pins 92 are movable in the slots 94, the pulleys 90, 91 are movable toward and away from each other. By moving the pulleys 90, 91 toward and away from each other, force is transmitted to the cable and torque is thereby applied to the cam member 66.

Drive means, such as the hydraulic cylinders 96, are provided to move the pulleys 90, 91 toward and away from each other. The cylinders 96 have piston rods 97 which are connected to the clevises 93, as best seen in FIG. 7. The cylinders 96 have their bodies pivotally secured to the frame members 52, 80 by means of the extending pins 99 which extend through complementary openings in the frame members 52, 80. It should be understood that the cylinders 96 are of any conventional construction and are operable in either direction to move the pulleys 90, 91 away from or toward each other.

It should be understood that only one of the pulleys 90, 91 is necessary to create a force in the cable 72. If both pulleys 90, 91 are utilized, as shown in the drawings, the cylinders 96 need not have a long stroke but rather have a short stroke to decrease the size of the mechanism 10 while providing the necessary stroke and force.

Hydraulic supply lines 106 are connected from a source of pressurized hydraulic fluid contained in the grapple skidder 14 to the pistons 96. The grapple skidder 14 also includes activating means for selectively connecting the source of pressurized fluid to the lines 106 so that pressurized fluid is supplied to the cylinders 96. Thus, a force is exerted by the cylinders 96 to the pulleys 90, 91 and, consequently, a torque is applied to the jaw 20.

When the jaw 20 is in the open position 56 and a tree to be delimbed is received in the opening 58, the hydraulic cylinders 96 are activated by the activating means in the grapple skidder 14. A force is applied to the pulleys 90, 91, which are in the position shown at 110 while the jaws are in the position indicated at 56. This force urges the pulley 90 along the slot 94, as viewed in FIG. 3. This force is transmitted to the cable 72 and, consequently, a torque is created on the jaw 20, in a manner hereinabove described. The jaw 20 thus moves toward the tree trunk to be delimbed and which is positioned between the jaws.

The jaws 20, 18 have a portion 112, such as sharpened edges, for removing the limbs from a tree as they move along the tree. It should be understood that any other surface or mechanism may be applied to the jaws 18, 20 which may effectively remove limbs from a tree, as well known by those skilled in the art.

As the delimbing mechanism 10 is moved along the tree, the jaws 18, 20 move toward each other and the opening 58 therebetween decreases in size. The pressurized fluid supply connected to the cylinders 96 is maintained in communication therewith at a substantially constant pressure to maintain a substantially constant force on the cable 72. The drive mechanism 60 correspondingly decreases the amount of torque applied to the jaws 18, 20, as hereinabove described, due to the contoured surface 76 of the cam members 66.

In operation, the drive mechanism 60 decreases the amount of torque applied to the jaws 18, 20 as the diameter of the tree decreases by decreasing the effective moment arm of the force exerted by the cables and their respective jaws. When the jaws are positioned adjacent to the large end of the tree, generally indicated at the position 112, the cam member 66 is in a position 113, shown in dashed lines in FIG. 6. When the cam member 66 is in such a position 113, a moment arm, indicated at A, is provided between the line of force of the cable 72 and the center of the pin 82 about which the cam member 66 rotates. Thus, the torque exerted on the jaws at this point is equal to the force exerted on the cable 72, multiplied by the moment arm A.

Figure 6:
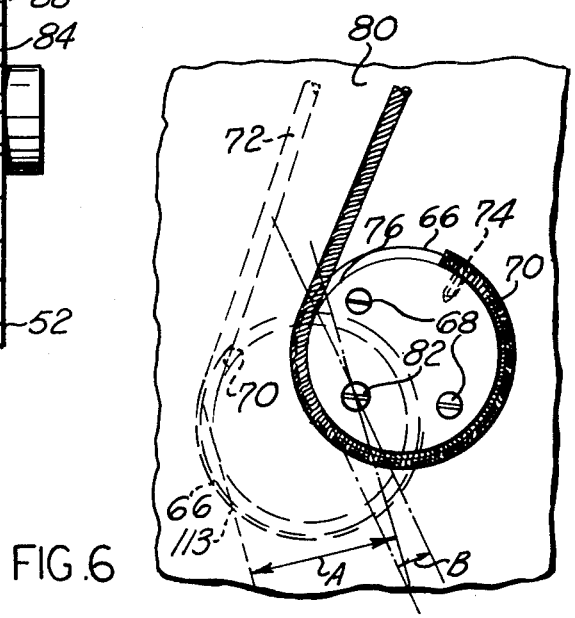
FIG. 6 is a schematic view of a portion of the delimbing mechanism shown in FIG. 3 to illustrate the operation thereof.

As the jaws 18, 20 move from the position 112 to the closed position, indicated at 62, the cam member 66 rotates in a clockwise direction and the moment arm gradually decreases in size. Consequently, the torque exerted by the drive mechanism 60 gradually decreases. As the delimbing mechanism 10 moves along the tree, the moment arm decreases from a magnitude indicated by A to a magnitude indicated by B. When the jaws move to the closed position 62, a moment arm, indicated B in FIG. 6, is provided. Since the force of the cable 72 remains constant, the torque exerted on the jaws 18, 20 by the drive mechanism decreases dependent on the magnitude of the moment arm, as herein above described.

As the delimber 10 moves along the tree, the jaws 18, 20 continue to move toward each other and the pulleys 90, 91 continue to move away from each other to a closed position 114, at which point the jaws 18, 20 are in the closed position 62 and the tree is delimbed. It should be understood that the apparatus may be moved along the tree either from the large end to the small end, or vice versa, while realizing the advantages of the present invention.

As noted above, as the jaws move along the tree, the jaws are vibrated. This vibration is effected by means, generally indicated at 120, and secured to frame member 52. The vibrating means 120 may be of any construction well known to those skilled in the art, as, for example, a ball contained in a cylinder wherein pressurized fluid supplied to the cylinder rotates the ball therein and thus produces vibration. The pressurized fluid is supplied to the cylinder by a supply conduit 122.

The vibration produced by the vibrating mechanism 120 is transmitted to the jaws 18, 20 as they move along the tree to remove the limbs therefrom and develop a very high frequency vibratory action of the jaws. This vibratory motion, plus the weight and design of the components remove the limbs of a tree by impact, multiplied force, and cutting action. The vibratory action of the jaws 18, 20 results in a cutting action as the sharp edges 112 of the jaws 18, 20 engage the limb while the flexible mounting 22 permits the delimber to twist and flex over the surface as dictated by the position of the limb itself. In most instances, the apparatus 10 will be removing at least two limbs at any given time.

After the tree is delimbed, a mechanism, such as the cylinders 126, is provided to move the jaws 18, 20 from the closed position 62 to the open position 56, so that another tree may be received therein to be delimbed. The cylinders 126 are pivotally connected to the frame member 80 by any conventional means. The rods 128 of the cylinders 126 are pivotally secured to the jaws 18, 20 by means of pins 130. Pressurized fluid is supplied to the cylinders 126 by means of a conduit 134 which is connected to a source of pressurized fluid in the grapple skidder 14.

Means is also provided in the grapple skidder 14 to selectively control the supply of pressurized fluid to the cylinders 126. When the jaws 18, 20 are in the closed position 62 and it is desired to move them to the open position 54, 56, respectively, pressurized fluid is supplied to the cylinders 126 through the conduits 134 and is no longer supplied to the cylinders 96. Consequently, the jaws 18, 20 are moved to the open position 54, 56, respectively. When it is desired to delimb another tree, the fluid pressure is removed from the hydraulic cylinders 126 to allow the jaws 18, 20 to be moved by the cylinders 96 into a position whereby they communicate the limbs of the tree.

From the above, it should be apparent that a highly improved apparatus for removing limbs from a tree has been provided comprising frame members 52, 80 for pivotally mounting a pair of jaws 18, 20. The jaws define an opening therebetween and are adapted to receive a tree therebetween. The jaws are closed about the tree trunk with a force which varies with trunk diameter, and the jaws have means for removing the limbs from the tree upon movement of the jaws 18, 20 relative to the tree. Means 120 vibrates the jaws 18, 20 as they move relative to the tree to remove the limbs therefrom. Thus, it can be seen that a new and improved method and apparatus are provided for removing the limbs from a tree by vibrating the jaws 18, 20, which vibration removes the limbs by impact, multiplied force, and cutting action.

Having described my invention, I claim:

1. An apparatus for removing the limbs from a tree comprising a frame means, first and second delimbing jaws carried by said frame means, means pivotally mounting one of said jaws on said frame means, said first and second delimbing jaws defining an opening therebetween and adapted to receive a tree therebetween, said jaws having means for removing the limbs from the tree upon movement of the jaws relative to the tree, and means for vibrating said jaws as said jaws move relative to the tree to remove the limbs therefrom.

2. An apparatus for removing a limb from a tree as defined in claim 1 including jaw-actuating means drivingly connected to said pivotally mounted jaw to provide rotational movement to said pivotally mounted jaw with a force dependent on the diameter of the tree portion received between said jaws.

3. An apparatus for removing the limbs from a tree as defined in claim 2 wherein said jaw-actuating means includes a cam member secured to said pivotally mounted jaw, a cable secured to said cam member and positioned about its peripheral extent, and means for exerting a force on said cable to provide a torque to said pivotally mounted jaw through said cam means to urge said jaw against the tree trunk.

4. An apparatus for removing limbs from a tree as defined in claim 3 wherein said cable of said jaw-actuating means has one end secured to said cam member and extends about a portion of the peripheral extent thereof and having its other end secured to said frame means, said jaw-actuating means further including a pulley interposed between the ends of said cable, and a mechanism for moving said pulley to exert a force on said cable which in turn is transmitted to said cam.

5. An apparatus for removing limbs from a tree as defined in claim 1 wherein said first and second delimbing jaws are pivotally mounted to said frame means and define an opening therebetween adapted to receive a tree therein.

6. An apparatus for removing limbs from a tree as defined in claim 5 including drive means for exerting a torque on said first and second jaws dependent on the diameter of the tree trunk positioned therebetween and which said first and second jaws engage.

7. An apparatus for removing limbs from a tree as defined in claim 1 wherein said vibrating means is mounted on said frame means and a mounting means is provided for yieldably supporting said frame means on a support structure so that the vibrations imparted to said jaws by said vibrating means is isolated to said frame means and concentrated in said jaws and not transmitted to the support structure.

8. An apparatus for removing limbs from a tree as defined in claim 7 wherein said means for yieldably supporting said frame includes a plurality of pins secured to said frame means and slidably received in an opening of a support member which supports said frame means while isolating the vibration imparted to said jaws by said vibrating means thereto.

9. An apparatus for removing limbs from a tree as defined in claim 8 wherein said means for yieldably supporting said frame includes spring means positioned on said pins and adjacent said mounting means to bias the said pins in one direction while allowing said pins to slidably move with respect to said mounting means.

10. An apparatus for removing the limbs from a tree comprising a frame means, first and second delimbing jaws carried by said frame means, means pivotally mounting one of said jaws on said frame means, said first and second delimbing jaws defining an opening therebetween having a size dependent on the position of said jaws and which opening receives a tree therein, drive means drivingly connected to said pivotally mounted jaw to effect closing thereof including means for pivoting said jaw through a variable length lever arm to exert a torque thereon dependent on the size of the opening between said jaws.

11. An apparatus for removing the limbs from a tree comprising a frame means, first and second delimbing jaws carried by said frame means, means pivotally mounting one of said jaws on said frame means, said first and second delimbing jaws defining an opening therebetween having a size dependent on the position of said jaws and which opening receives a tree therein, drive means drivingly connected to said pivotally mounted jaw to effect closing thereof includes means for pivoting said jaw to exert a torque thereon dependent on the size of the opening between said jaws, and means for vibrating said jaws as said jaws move relative to the tree to remove the limbs therefrom.

12. An apparatus for removing the limbs from a tree as defined in claim 10 wherein said drive means includes a cam member drivingly connected with said jaw and said means for pivoting said jaw includes a cable secured to said cam member and positioned about the peripheral extent thereof, said drive means further including means for exerting a force on said cable so that said cam member exerts a torque on said pivotally mounted jaw, said cam member having a profile such that the torque exerted on said pivotally mounted jaw decreases as the opening between said first and second delimbing jaws decreases in size.

13. An apparatus for removing the limbs from a tree as defined in claim 12 wherein said cable has one end secured to said cam member and a portion of said one end wrapped about the peripheral extent of said cam member, said cable having another end secured to a fixed member, said drive means including a pulley positioned between said one and second ends of said cable, and means for moving said pulley so that a force is exerted on said pulley to provide a force on said cable so that a torque is exerted by said cam member on said pivotally mounted jaw.

14. An apparatus for removing the limbs from a tree as defined in claim 13 wherein said means for moving said pulley provides a constant force to said pulley and consequently to said cable, said cam surface having a contour such that the torque exerted thereby on said pivotally mounted jaw decreases as the size of the opening between said first and second jaws decreases.

15. An apparatus for removing the limbs from a tree as defined in claim 12 wherein said first and said second delimbing jaws are pivotally mounted to said frame means, said drive means drivingly connected to said first and second jaws to exert a torque thereon dependent on the size of the opening between said jaws.

16. A method for removing the limbs from a tree comprising the steps of receiving the tree between the movable jaws of a delimbing apparatus, vibrating the jaws of the delimbing apparatus and moving the jaws along the tree to remove the limbs therefrom.

17. A method for removing the limbs from a tree as defined in claim 16 which includes the step of exerting a torque on the movable jaws determined by the size of the limbs of the tree in the opening defined between the jaws after the step of receiving the tree between the movable jaws.

18. A method for removing the limbs from a tree as defined in claim 16 which includes the step of exerting a torque on the movable jaws of the delimbing apparatus dependent on the position of the jaws along the length of the tree after the step of receiving the tree between the movable jaws.

19. A method for removing the limbs from a tree as defined in claim 16 which includes the step of releasing the delimbed tree from between the movable jaws after the step of moving the jaws along the tree to remove the limbs therefrom.

20. An apparatus for removing the limbs from a tree as defined in claim 10 wherein said means for pivoting said jaw includes a cam connected to said jaw to pivot said jaw in response to a force applied upon the circumference of said cam.

* * * * *